United States Patent [19]

Tartaglia

[11] 4,394,947
[45] Jul. 26, 1983

[54] AUTOMOBILE CARGO CARRYING RACK

[76] Inventor: Paul Tartaglia, 12414 Veronica Cir., Dallas, Tex. 75234

[21] Appl. No.: 244,262

[22] Filed: Mar. 16, 1981

[51] Int. Cl.³ ............................................. B60R 9/06
[52] U.S. Cl. ...................... 224/42.43; 224/42.03 A; 224/42.07; 224/42.45 R
[58] Field of Search ..................... 224/42.45 R, 42.43, 224/42.44, 42.32, 42.03 R, 42.03 A, 42.07, 42.08, 42.03 B

[56] References Cited

U.S. PATENT DOCUMENTS

| | | | |
|---|---|---|---|
| 1,498,715 | 6/1974 | Benoist | 224/42.43 |
| 2,401,388 | 6/1946 | Striker | 224/42.08 |
| 2,777,625 | 1/1957 | Kronhaus et al. | 224/42.43 |
| 3,158,302 | 11/1964 | Dickerson | 224/42.43 |
| 3,650,443 | 3/1972 | Haskett et al. | 224/42.07 X |
| 3,690,526 | 9/1972 | Rundel | 224/42.07 |
| 3,913,811 | 10/1975 | Spencer | 224/42.08 |
| 4,301,953 | 11/1981 | Abbott | 224/42.03 B |

Primary Examiner—Allan N. Shoap

[57] ABSTRACT

An all purpose automobile cargo carrying rack connected solely to the tongue of a standard trailer hitch. A vertical member with a horizontal member fixedly attached to one end and a base plate and threaded rod fixedly attached at the other end. The threaded rod is inserted through the hole of a trailer hitch tongue and bolted thereto to form a rigid post. A rectangle frame bolted to the horizontal member of the vertical member and extending rearward. A pair of support brackets bolted to the rear of the frame and extending downward to the base plate of the vertical post and bolted thereto to form a clamp around the tongue of the trailer hitch to prevent squirming and twisting of rack.

1 Claim, 3 Drawing Figures

AUTOMOBILE CARGO CARRYING RACK

BACKGROUND OF THE INVENTION

This invention relates to an automobile cargo carrying rack which is attached to the tongue of an automobile trailer hitch.

The advent of the energy crisis and proliferation of compact and subcompact automobiles has left little room in an automobile to carry cargo items that would normally fit into the trunk of a mid-size and full size automobile. Four passengers in a compact automobile leave very little room for cargo and personal belongings.

The present invention provides for a detachable automobile cargo carrying rack which is attached to the tongue of an automobile trailer hitch. When attached to the tongue of a trailer hitch, the cargo carrying rack provides additional room for carrying items that otherwise could not be carried for lack of space. Moreover, when the cargo carrying rack is not needed, it can be detached and stored in the trunk of a compact or subcompact automobile until needed.

Additional advantages of the cargo carrying rack are that when in use it does create additional wind resistance, therefore does not decrease gas mileage; is portable and stores in the automobile trunk for ready use; the cargo carrying rack does not come in contact with the automobile body, thereby eliminating paint scratches and hole drilling in the automobile body; easy installation and removal; can be installed on any automobile that has a trailer hitch with a tongue; easy access to load and unload cargo; the cargo carrying rack is a lifetime investment since it is not permanently attached to the automobile and can be used on any automobile that has a trailer hitch and tongue.

SUMMARY OF THE INVENTION

In accordance with the present invention, there is provided an automobile cargo carrying rack which is fastened to the tongue of an automobile trailer hitch. The cargo carrying rack is made of metal and provides a means of increasing cargo carrying capacity especially for compact and sub-compact automobiles. The cargo carrying rack also has a means for detaching and easy storing in the trunk of an automobile.

DESCRIPTION OF THE PREFERRED EMBODIMENT

Figure 1:
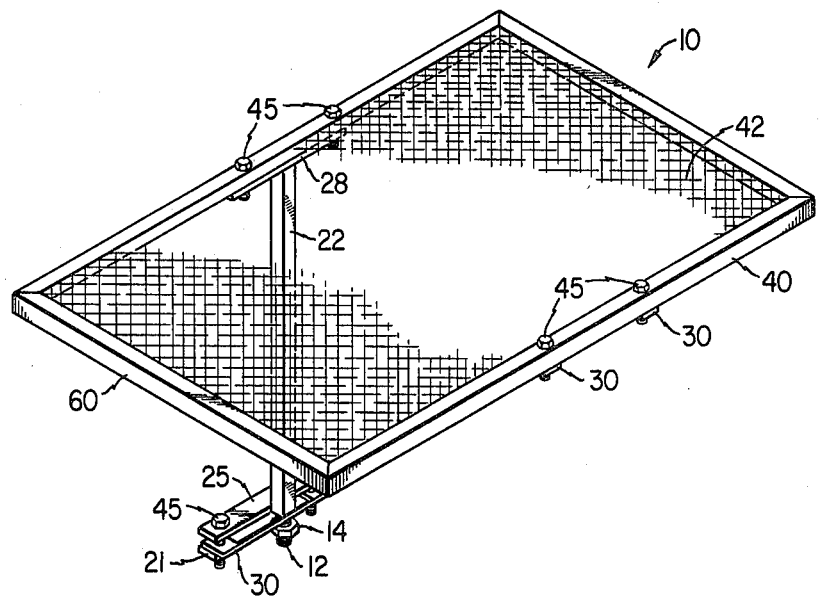
FIG. 1 is a perspective view of an automobile cargo carrying rack according to the invention.
Figure 2:
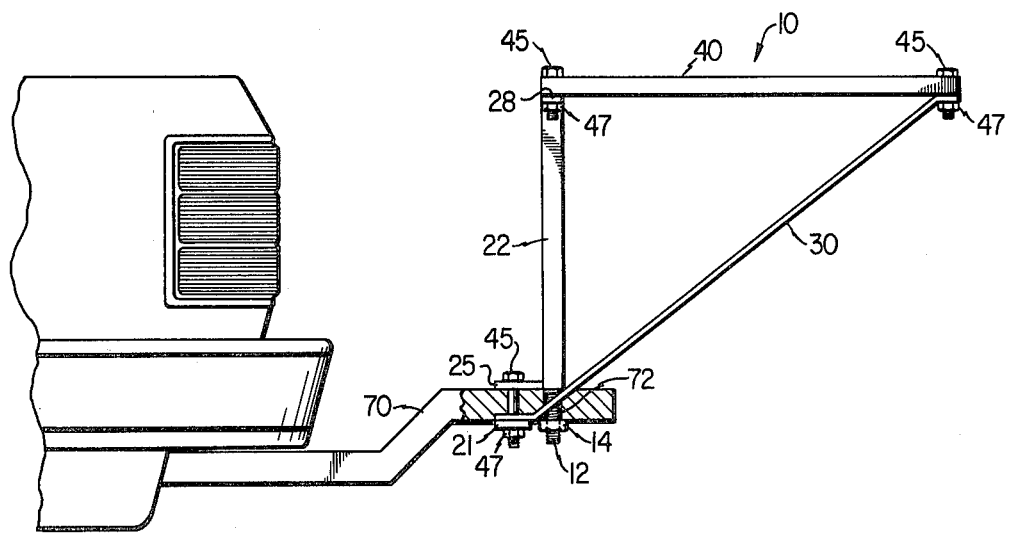
FIG. 2 is a side elevation view of the cargo carrying rack of FIG. 1 as mounted on the tongue of a trailer hitch.
Figure 3:
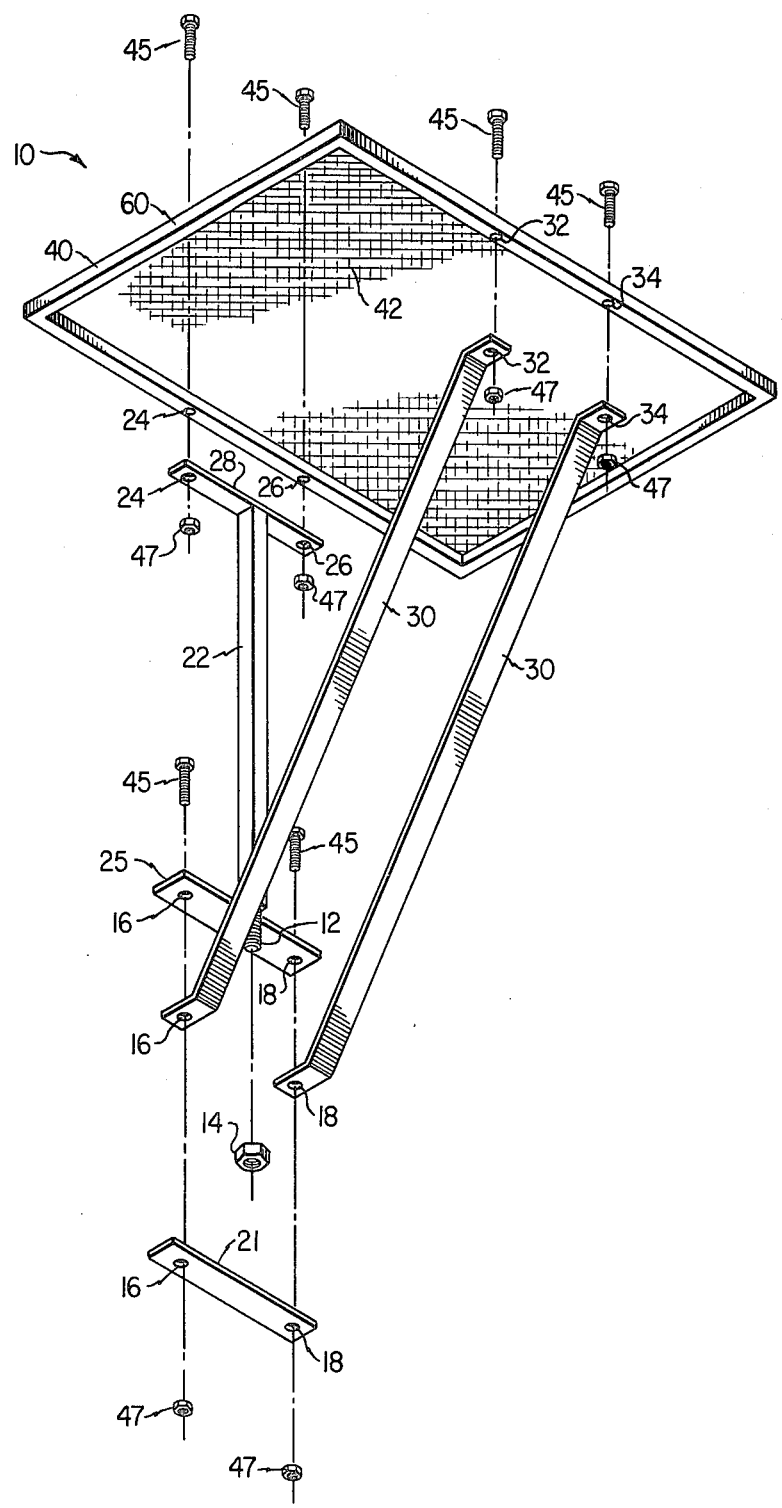
FIG. 3 is a side elevation view of the cargo carrying rack when not attached.

FIGS. 1, 2 and 3 show an automobile cargo carrying rack, indicated generally by the reference numeral 10. Preferably, the material of 10 is a combination of angle iron 60, expandable metal mesh 42, square tubing 22, and flat mild steel 30 as shown in FIG. 3.

As shown in FIG. 2, the cargo carrying rack post or vertical member 22 is fastened to the tongue 70 of a trailer hitch by means of a threaded rod 12 inserted through hole 72 in the tongue and fastened with nut 14. In FIG. 3, the rack top 40 is placed on top of post bracket or plate member 28 and holes 24 and 26 of rack top 40 are aligned with post bracket 28, holes 24 and 26, and bolted together with nut 47 and bolt 45. Support bracket or strut 30 is placed under rack top 40 aligning hole 32 of rack top 40 with support bracket 30 hole 32 and bolted together with nut 47 and bolt 45. Support bracket or strut 30 is placed under rack top 40 aligning hole 34 of rack top 40 with support bracket 30, hole 34 and bolted together with nut 47 and bolt 45. Support bracket 30 is sandwiched between post bracket or plate member 25 and bracket or plate member 21 aligning hole 16 of post bracket 25, support bracket 30, and bracket 21 and bolted together with nut 47 and bolt 45. Support bracket 30 is sandwiched between post bracket 25 and bracket 21 aligning hole 18 of post bracket 25, support bracket 30, and bracket 21 and bolted together with nut 47 and bolt 45.

Although preferred embodiments of the invention have been described in detail, it is to be understood that various changes, substitutions and alterations can be made therein without departing from the spirit and scope of the invention.

Having thus described my invention, what I claim and desire to protect by Letters Patent of the United States is:

1. An all purpose cargo carrying rack for connecting to the tongue of a standard trailer hitch, said carrying rack comprising:
   a platform forming a horizontal supporting surface for cargo to be carried, said platform including a rectangular frame surrounding said supporting surface;
   securing means for connecting said platform to the trailer hitch tongue, said securing means including:
   (1) a vertical member having a first horizontal plate member at one end having means for aligning and releasably securing to one of the sides of said frame, the other end of said vertical member having a threaded extension for passing through an aperture in the trailer hitch tongue to releasably secure said vertical member by means of a threaded nut, a second horizontal plate member adjacent to said threaded extension and offset therefrom;
   (2) a pair of spaced struts having means for releasably securing one end of each strut to a side of the frame opposite said one of the sides, said struts constructed to extend from the side of the frame opposite said one of the sides downwardly toward and below said second horizontal plate member;
   (3) a third horizontal plate member;
   said second horizontal plate member, said third horizontal plate member, and the ends of said spaced struts opposite said one end of each strut having means to substantially vertically align the second and third horizontal plate members and to releasably secure them and said ends of said spaced struts together while a portion of the trailer hitch extends between said second and third horizontal plate member.

* * * * *